Nov. 14, 1950 J. H. GEISSE 2,529,933
AIRPLANE CROSS-WIND UNDERCARRIAGE
Filed Dec. 20, 1947 3 Sheets—Sheet 1

INVENTOR
John Harlin Geisse

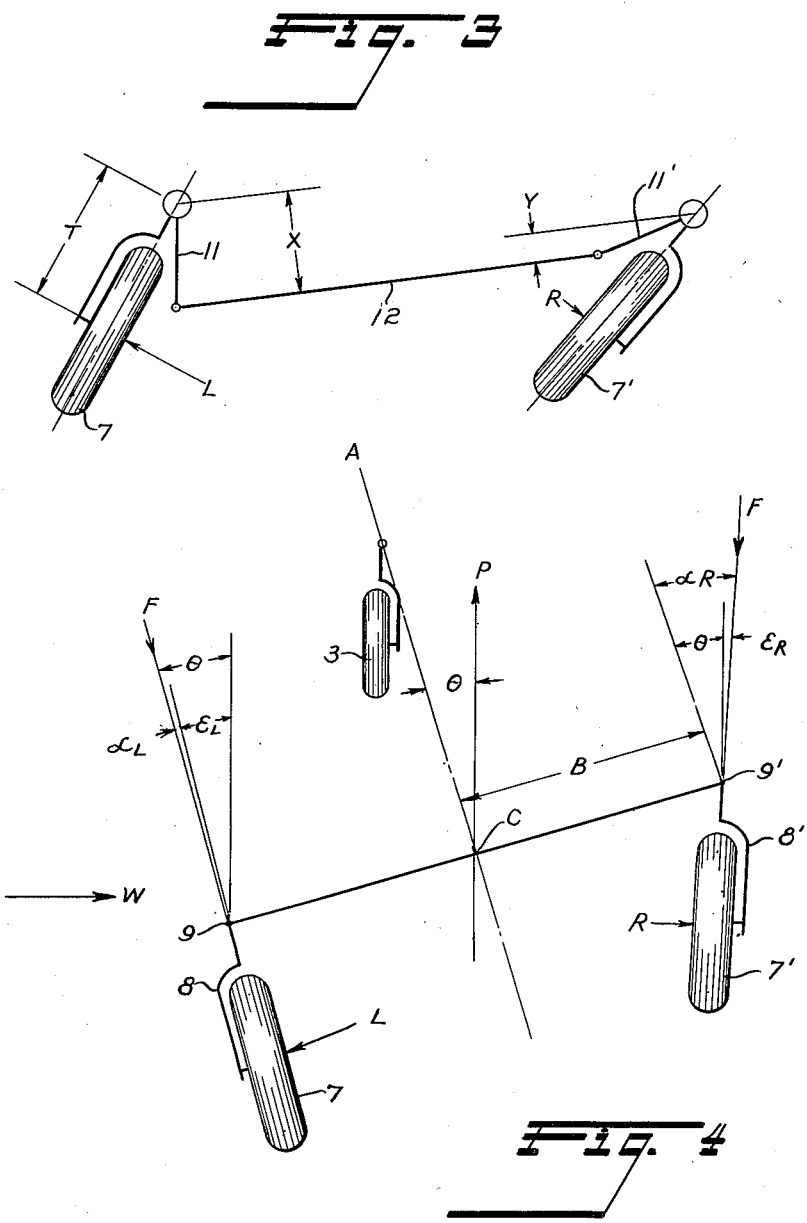

Nov. 14, 1950 J. H. GEISSE 2,529,933
AIRPLANE CROSS-WIND UNDERCARRIAGE
Filed Dec. 20, 1947 3 Sheets-Sheet 3

INVENTOR
John Harlin Geisse

Patented Nov. 14, 1950

2,529,933

UNITED STATES PATENT OFFICE 2,529,933

AIRPLANE CROSS-WIND UNDERCARRIAGE

John Harlin Geisse, Madison, Wis.

Application December 20, 1947, Serial No. 792,910

8 Claims. (Cl. 244—103)

My invention relates to improvements in airplane undercarriages of the so-called cross-wind landing type and has for its objective an improvement in the performance of such undercarriages. It constitutes a further improvement over the invention described in my pending application for Letters Patent, Serial No. 786,118, filed November 17, 1947.

Practically all airplanes when taxied crosswind have a pronounced weather vaning tendency; i. e. they tend to head into the wind and require the constant application by the pilot of a down wind turning effort to maintain a straight path. When ground steering is accomplished by differential braking of the main wheels this materially increases the wheel drag and increases the take-off run in cross-wind takeoffs. When the weather vaning is pronounced and the main wheels are not well forward of the center of gravity of the airplane, cross-wind taxiing in heavy winds may be impossible as the required braking effort may cause the airplane to nose over.

This weather vaning tendency can also make cross-wind takeoffs and landings difficult and hazardous in two-control airplanes with tricycle undercarriages in which the nose wheel is used for steering and is inter-connected with the ailerons. In such airplanes the nose wheel can not be turned downward without at the same time displacing the ailerons for a down wind turn. This increases the lift of the upwind wing relative to the down wind wing with a resulting roll of the airplane which can be sufficient to cause the downwind wing to strike the ground.

In my co-pending application, Serial Number 786,118, filed November 14, 1947, I disclosed an undercarriage construction in which the caster restraint on the downwind wheel was less than the caster restraint on the upwind wheel to improve the airplane's ground looping and weather vaning characteristics. By my present invention I further reduce the caster restraint on the downwind wheel through zero to a negative value; i. e. the downwind wheel is urged to caster through an angle which exceeds the angle of drift. This reverses the direction of the side load on the tire of the downwind wheel and this side load then provides in combination with the side load on the upwind wheel a turning moment on the airplane tending to turn it out of the wind, thus compensating in whole or in part for the tendency of the airplane to weather vane.

The nature of the invention is such that it can be most clearly illustrated by diagrams.

Figures 3 and 4 are diagrammatic illustrations.

Fig. 1 is a plan view and Fig. 2 a rear elevation showing one embodiment of my invention as applied to a tricycle type undercarriage.

Figure 1:
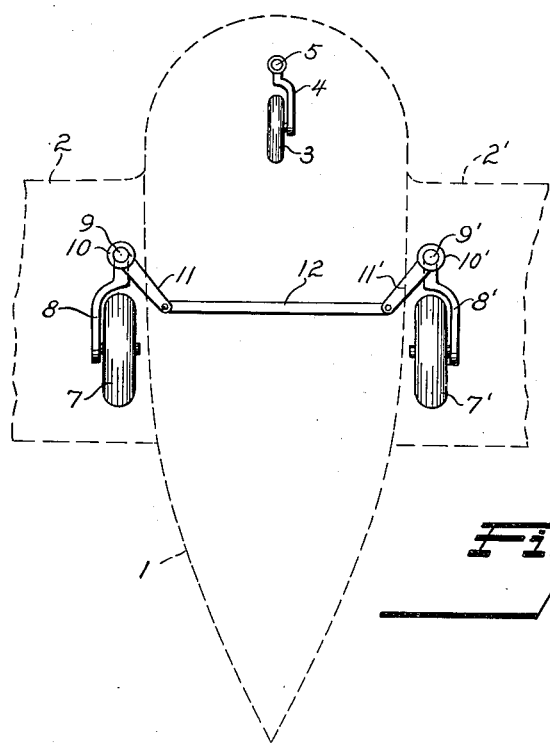
Figures 1 and 2 are plan and elevation views, respectively, of one application of the invention.
Figure 2:
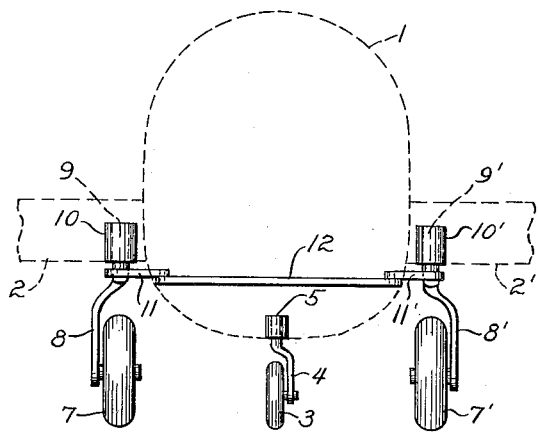

In both Figures 1 and 2 the structure of the airplane is shown by dashed lines, 1 being the fuselage and 2, 2' being the wing stubs. The nose wheel 3 is mounted on the half-fork 4 which is in turn attached to the spindle 5. Spindle 5 is rotatably supported in a bearing 6 which is attached to some suitable member of the fuselage 1.

The main wheels 7, 7', are mounted on halfforks 8, 8' which are attached to the spindles 9 and 9'. Spindles 9, 9' are rotatably supported in bearings 10, 10' which are attached to some suitable members of the wing stubs 2, 2'.

Fastened to the spindles 9, 9' and rotating with them are the arms 11, 11' extended backwardly and inwardly from the spindles 9, 9'. A crossbar 12, shorter than the distance between the spindles 9, 9', is pivotally connected at opposite ends to the arms 11, 11'.

Fig. 3 shows the main wheels 7, 7' in a castered position and as will be noted the right wheel is castered through a greater arc than is the left wheel due to the use of a crossbar 12 which is shorter than the distance between the caster spindles 9, 9'. It will be apparent in Fig. 3 that the moment arm Y of the crossbar 12 around the right caster spindle 9' is less than the moment arm X of the bar 12 around the left caster spindle 9. It will also be apparent that any forces applied tangentially to the wheels 7, 7' will produce no turning moments around the spindles 9, 9'. On the other hand any horizontal ground to wheel forces, such as indicated by the vectors R and L, which are perpendicular to the planes of the wheels 7 and 7', will have moment arms around the caster spindles 9, 9' of length T. In the absence of any other forces tending to turn the wheels 7, 7' around their spindles 9, 9' equilibrium is established when:

$$R = \frac{Y}{X}L$$

In Fig. 4 the wheels 7, 7' are shown in their relationship to the airplane and its path during cross-wind landing and taxiing. The center of gravity of the airplane C is assumed to be at the intersection of the longitudinal axis AA and the line connecting the spindles 9, 9'. The distance from the spindles 9, 9' to the center of gravity is designated as B.

The direction of the path is shown by the arrow P and the angle between the path and the axis of the airplane AA is designated as $\theta$. The caster angles of the wheels are designated as $\alpha_R$ and $\alpha_L$ for the right and left wheels respectively. The angle between the planes of the wheels and the path, commonly termed "cornering" angles, are designated as $\epsilon_R$ and $\epsilon_L$. The direction of the wind is indicated by the arrow W.

In Fig. 3 it was shown that for equilibrium $$R = \frac{Y}{X} L$$

Returning now to Fig. 4, it will be apparent to one skilled in the art that if R exceeded L, both wheels 7, 7' would rotate anti-clockwise around the spindles 9, 9'. This rotation would reduce the cornering angle $\epsilon_R$ and R and increase the cornering angle $\epsilon_L$ and L. It is therefore evident that the mechanism is stable, i. e. the caster angles $\alpha_R$ and $\alpha_L$ will adjust themselves to the drift angle $\theta$ to secure the required relationship between L and R.

In Fig. 4, the tangential components of the ground to wheel forces are indicated by the vectors F and F'. Since these components produce no turning moments around the spindles 9, 9', they are shown as applied to the spindles.

With B representing the distance from the spindles 9, 9' to the center of gravity C and considering all force components as positive in the directions indicated in Fig. 4 and assuming clockwise rotation around the center of gravity as positive, the moments for the ground to main wheel forces are as follows:

$$F'B \cos \alpha_R - FB \cos \alpha_L + L(T + B \sin \alpha_\lambda) -$$
$$R(T - \sin \alpha_R) = B(F' \cos \alpha_R - F \cos \alpha_L +$$
$$L \sin \alpha_L + R \sin \alpha_R) + T(\alpha - R)$$

Placing $\alpha_R$ equal to $\alpha_L$, R would be reversed in direction and equal numerically to L and F would equal F'. The resultant moment would then be $T(\alpha + R)$.

However, for the same algebraic total of the side forces on the main wheels, the L minus R in the case of differential caster angles must equal the L plus R in the case of equal caster angles. Hence, for the same algebraic total of side forces in the two cases, the use of the differential caster angles will provide an increase in clockwise turning moment, which in this case is anti-ground looping, over that with equal castering angles in the amount of:

$$B(F' \cos \alpha_R - F \cos \alpha_L + L \sin \alpha_L + R \sin \alpha_R)$$

Since the airplane wheels are mounted on antifriction bearings, the values of F, F' will be largely independent of the values of R and L and can therefore be assumed to be equal. Making this assumption and using, as an example, values of $\alpha_R = 30°$ and $\alpha_L = 20°$, the formula reduces to:

$$B(.342L + .5R - .071F)$$

Since F would normally be small as compared to L under substantial drift conditions a very material gain in anti-ground looping moments is therefore indicated.

Figure 5:
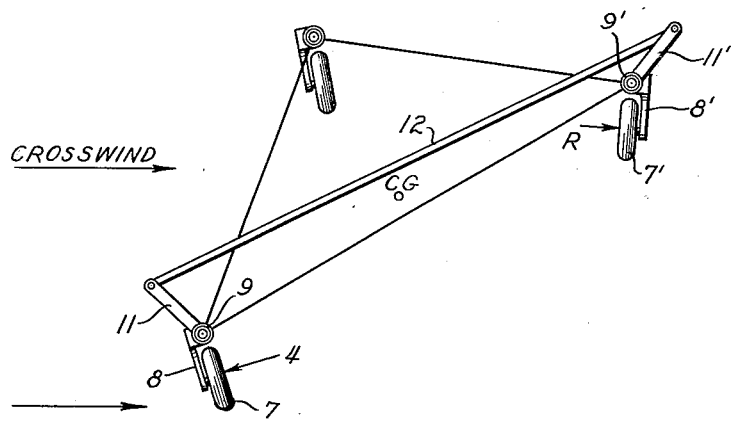
Figures 5, 6 and 7 are diagrammatic illustrations of a modification.
Figures 6, 7:
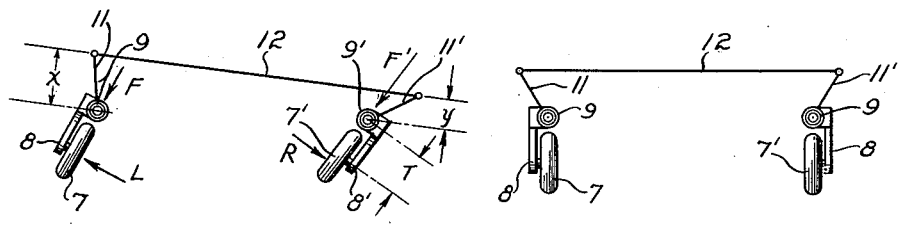

Figs. 5, 6, and 7 show a modified construction in which the cross bar 12 is placed ahead of the caster spindles 9 and 9' and in this case cross bar 12 must be longer than the distance between the spindles 9 and 9'. Except for this change the description of Figs. 1, 2 and 3 are equally applicable to the corresponding Figures 5, 6, and 7.

In the illustrations I have shown one means of obtaining the differential castering necessary to attain the objects of my invention. It, however, will be apparent to one skilled in the art that many other forms of interconnection between the wheels could be used without departing from the scope of my invention or of the appended claims.

What I claim is:

1. A cross-wind undercarriage for airplanes including laterally spaced ground engaging elements, caster mountings for said ground engaging elements, and means constraining said ground engaging elements to caster simultaneously in the same direction, said means including means constraining said ground engaging elements to toe out one relative to the other when castering.

2. A cross-wind undercarriage for airplanes including laterally spaced ground engaging elements, caster mountings for said ground engaging elements, means constraining said ground engaging elements to caster simultaneously in the same direction, said means including means constraining said ground engaging elements to toe out one relative to the other when castering, and a spindle mounted auxiliary ground engaging element spaced longitudinally from said laterally spaced ground engaging elements.

3. A cross-wind undercarriage for airplanes including laterally spaced main wheels, caster mountings for said main wheels, and means actuated by the castering of said main wheels constraining said main wheels to toe out one relative to the other.

4. A cross-wind undercarriage for airplanes including laterally spaced main wheels, caster mountings for said main wheels, means actuated by the castering of said main wheels constraining said main wheels to toe out one relative to the other, and a spindle mounted auxiliary ground engaging element spaced longitudinally from said laterally spaced ground engaging elements.

5. A cross-wind undercarriage for airplanes including laterally spaced main wheels, caster mountings for said main wheels, and linkage connecting said main wheels constraining them to caster in the same direction, said linkage simultaneously constraining one of said wheels to toe out through a greater angle than the other wheel toes in.

6. A cross-wind undercarriage for airplanes including laterally spaced main wheels, caster mountings for said main wheels, linkage connecting said wheels constraining them to caster in the same direction, said linkage simultaneously constraining one of said wheels to toe out through a greater angle than the other wheel toes in, and a spindle mounted auxiliary ground engaging element spaced longitudinally from said laterally spaced ground engaging elements.

7. A cross-wind undercarriage for airplanes including laterally spaced main wheels, caster mountings for said wheels and linkage actuated by the toeing in of one of said main wheels to constrain the other main wheel to toe out through a greater angle than the actuating wheel toes in.

8. A cross-wind undercarriage for airplanes including laterally spaced main wheels, caster mountings for said wheels, linkage actuated by the toeing in of one of said main wheels to constrain the other main wheel to toe out through a greater angle than the actuating wheel toes in, and a spindle mounted auxiliary ground engaging element spaced longitudinally from said laterally spaced ground engaging elements.

JOHN HARLIN GEISSE.

REFERENCES CITED

The following references are of record in the file of this patent:

UNITED STATES PATENTS

| Number | Name | Date |
|---|---|---|
| 1,810,054 | Miller | June 16, 1931 |
| 1,844,186 | Short | Feb. 9, 1932 |
| 2,110,563 | Thaon | Mar. 8, 1938 |
| 2,351,935 | Devlin | June 20, 1944 |